May 6, 1941.   J. B. ARMITAGE   2,240,973
MACHINE TOOL STRUCTURE AND CONTROL MECHANISM
Filed June 5, 1937   7 Sheets-Sheet 5
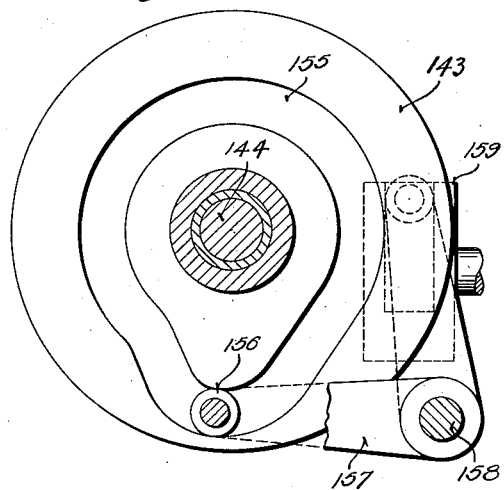
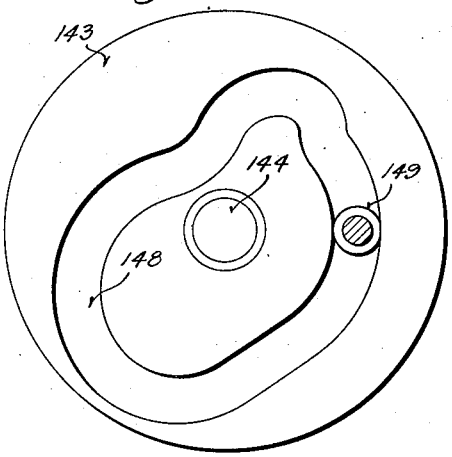
INVENTOR
JOSEPH B. ARMITAGE
BY W. D. O'Connor
ATTORNEY

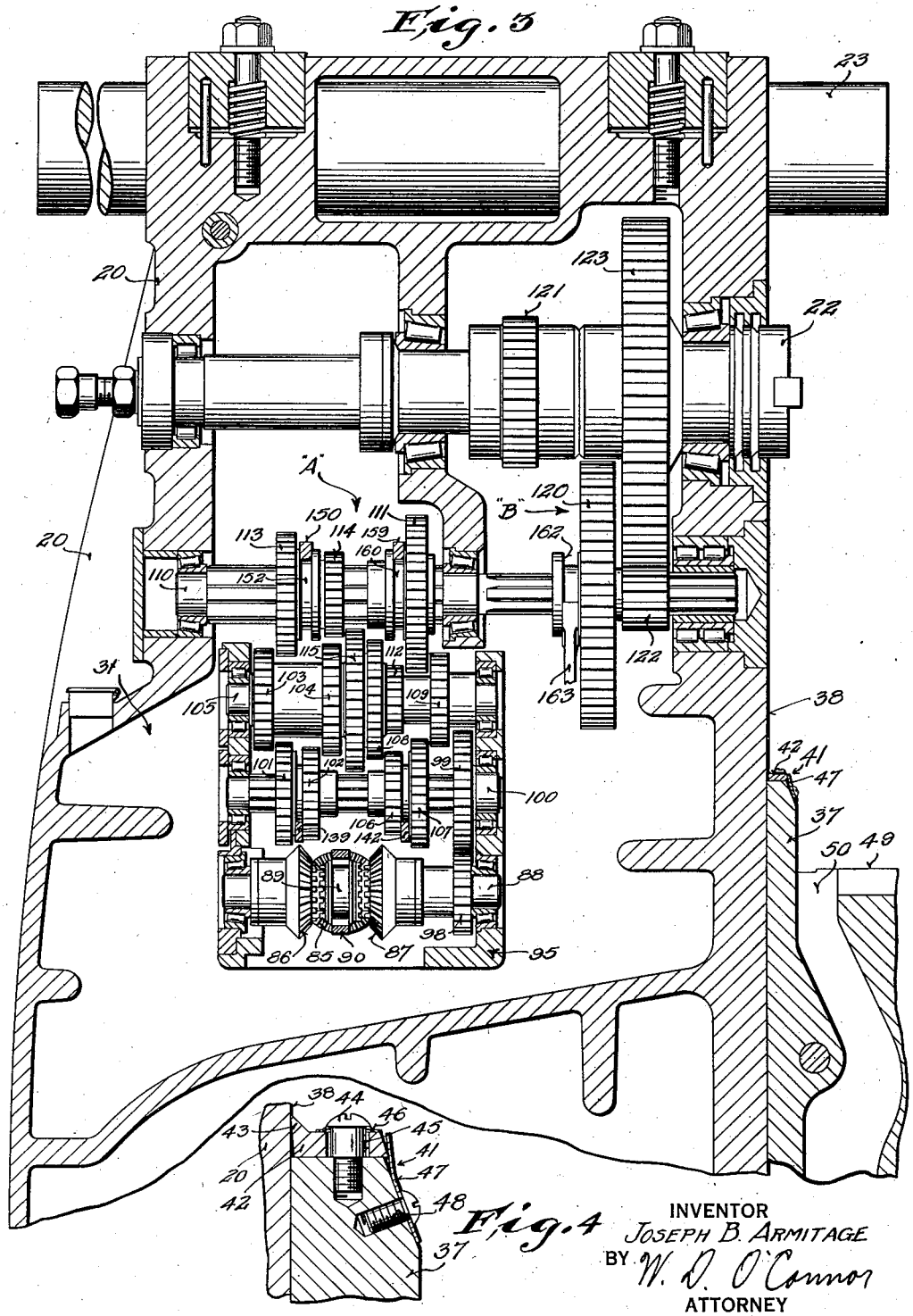

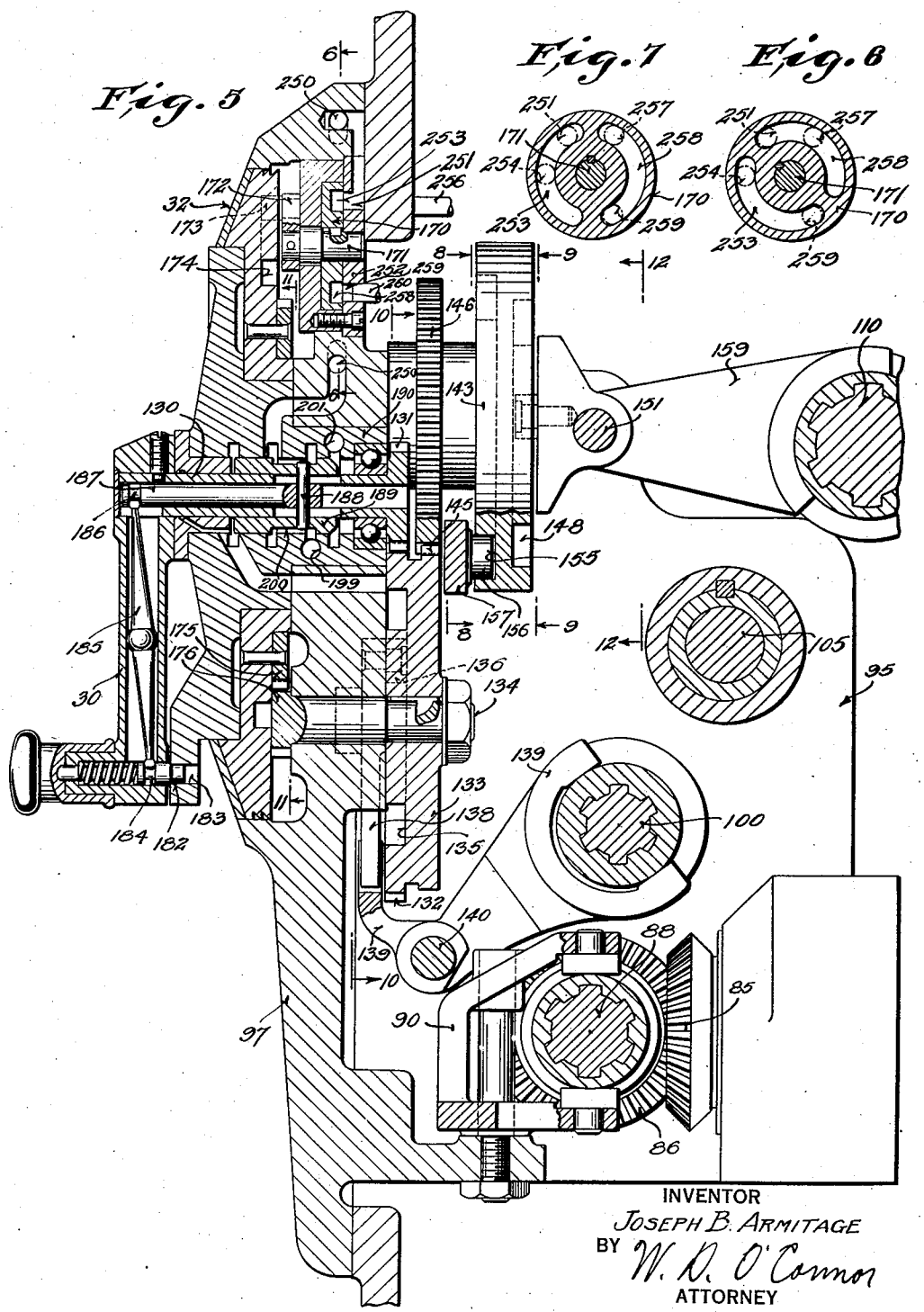

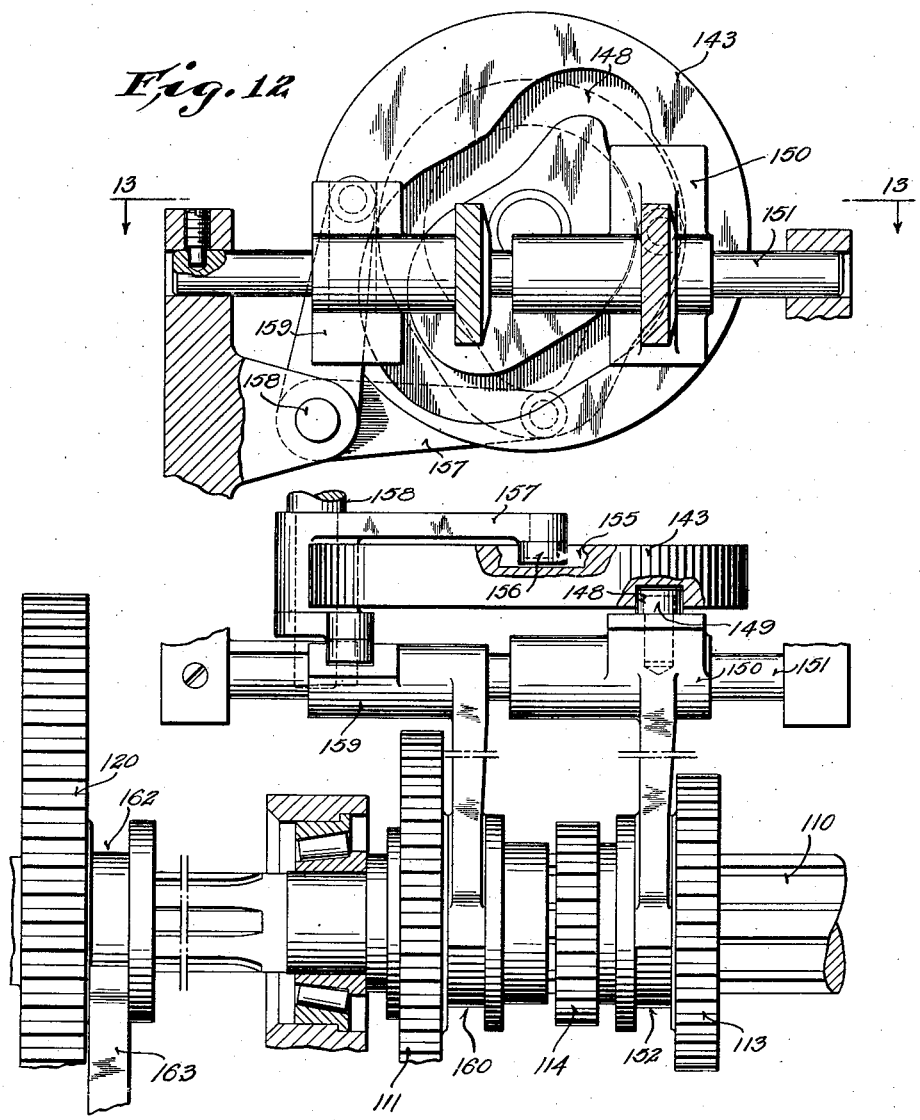

Patented May 6, 1941

2,240,973

UNITED STATES PATENT OFFICE 2,240,973

MACHINE TOOL STRUCTURE AND CONTROL MECHANISM

Joseph B. Armitage, Wauwatosa, Wis., assignor to Kearney & Trecker Corporation, West Allis, Wis., a corporation of Wisconsin Application June 5, 1937, Serial No. 146,581

48 Claims.  (Cl. 90—18)

This invention relates generally to improvements in machine tools and more particularly to improved operating mechanism and speed controlling apparatus for a milling machine.

A general object of the invention is to provide improvements in the construction of a milling machine power transmission and control mechanism of character resulting in greater convenience in operating the machine, and in reducing the risk of damage occurring while adjusting the moving parts of the machine.

Another object of the invention is to provide improved mechanism for controlling the shifting of speed changing gearing in a machine tool or the like.

Another object is to provide a transmission mechanism having mechanically actuated and hydraulically actuated gear shifting apparatus arranged to function cooperatively to effect speed adjusting gear changing movements of the mechanism.

Another object is to provide a speed changing transmission mechanism having two speed changing devices arranged in series relationship and a single control device arranged to directly shift one speed-changing device and to indirectly shift the other speed-changing device by pre-selecting a subsequently effected shifting movement thereof.

Another object is to provide a speed-changing transmission mechanism having a single speed-selecting member associated with means operative pre-requisite to a speed-selecting movement of the member to render part of the speed-changing mechanism non-responsive to the speed-selecting movement, and means operative subsequent to a speed-selecting movement of the member to effect response of the previously non-responsive part of the mechanism in accordance with an adjustment preselected by the speed-selecting movement of the member.

Another object is to provide a machine tool speed-changing transmission mechanism including a variable speed device and a range changer both adjustable in response to movement of a speed-selecting member, together with means arranged to prevent adjustment of the range changer until adjustment of the variable speed device has been completed.

Another object is to provide an auxiliary drive mechanism of improved construction for slowly rotating the gears of a speed-changing apparatus while they are being shifted, to facilitate the shifting operation.

Another object is to provide an auxiliary drive mechanism which functions as a brake to reduce the speed of the transmission mechanism prior to the shifting operation.

A further object of the invention is to provide an improved arrangement for the electrical control apparatus of the driving motor of a machine tool.

According to this invention, a machine tool such as a milling machine is provided with an improved speed-changing apparatus, including a variable speed device and a range changing device, the two devices being connected in series relationship and arranged to be driven by a disconnecting clutch disposed to transmit power to one of them. A speed-selecting member is arranged to shift the gears of the variable speed device directly, and to pre-select an adjustment of the gears of the range changer for subsequent shifting by power. As a pre-requisite to a speed-selecting movement, a latch on the speed-selecting member is arranged to function, upon unlatching movement thereof, to disengage the main clutch and to engage an auxiliary slow speed driving mechanism to reduce the speed of rotation of the gearing for facilitating shifting of the variable speed device. The unlatching movement also acts to establish a condition preventing shifting of the range changer during the shifting of the variable speed device. After the variable speed device has been shifted, latching movement of the latch on the speed-selecting member disconnects the slow speed driving device and functions to permit shifting of the range changer by power in accordance with the pre-selected adjustment. The auxiliary slow speed driving mechanism is of improved construction, and the machine is provided with an improved control arrangement for actuating the starting clutch and for starting and stopping the driving motor.

The foregoing and other objects of the invention, which will become more fully apparent from the following detailed description of apparatus exemplifying the invention, may be achieved by the milling machine described herein as a preferred embodiment thereof in connection with the accompanying drawings, in which:

Fig. 3 is a view in vertical longitudinal section of the upper part of the milling machine taken on the planes represented by the line 3—3 in Fig. 2, looking from the left side of the machine.

Fig. 4 is an enlarged detail view in vertical section of the bearing surface cleaner for the column face, shown at the top of the knee in Fig. 3.

Fig. 5 is an enlarged fragmentary view in vertical section taken on the planes represented by the line 5—5 in Fig. 1, and showing the speed controlling and indicating mechanism mounted on the left side of the column.

Fig. 6 is a detail view in cross section of the range change shifter control valve, taken on the plane represented by the line 6—6 in Fig. 5, the fixed valve ports being indicated by dotted circles.

Fig. 7 is a detail view similar to Fig. 6 but showing the valve turned to its other operating position.

Fig. 8 is a detail view of one side of the secondary gear shifting cam, taken partly in section on the plane represented by the line 8—8 in Fig. 5.

Fig. 9 is a view of the opposite side of the cam shown in Fig. 8, taken partly in section on the plane represented by the line 9—9 in Fig. 5.

Fig. 10 is a detail view of the primary gear shifting cam and part of the driving mechanism, taken partly in section on the plane represented by the line 10—10 in Fig. 5.

Fig. 11 is a detail view of the range changing valve controlling cam, taken partly in section on the plane represented by the line 11—11 in Fig. 5.

Fig. 12 is a detail view of the shifting mechanism associated with the secondary cam, taken partly in section on the plane represented by the line 12—12 in Fig. 5, the follower engaging the opposite side of the cam being shown in dotted lines.

Fig. 13 is a plan view, partly in horizontal section, of the secondary gear shifting mechanism, taken on the plane represented by the line 13—13 in Fig. 12.

Figure 14:
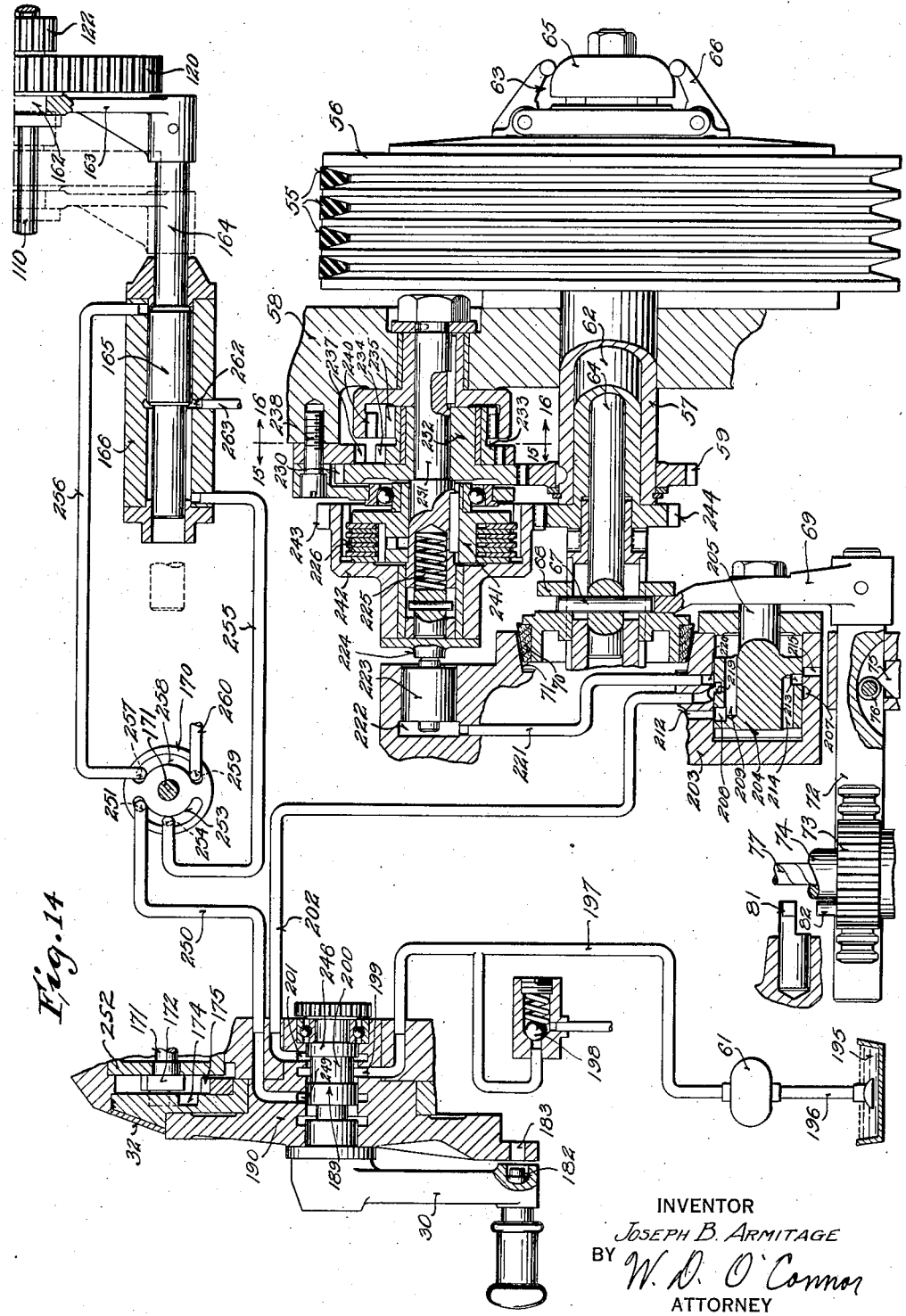
Fig. 14 is a schematic diagram of the hydraulic control circuit for effecting shifting of the speed changing gear mechanism, the slow speed auxiliary drive and other associated mechanisms being shown in longitudinal vertical section.

Fig. 15 (sheet 1) is a detail view in transverse vertical section of part of the slow speed auxiliary drive mechanism taken on the plane represented by the line 15—15 in Fig. 14, and Fig. 16 is another detail view of the auxiliary drive mchanism taken in transverse vertical section on the plane represented by the line 16—16 in Fig. 14, looking in the direction opposite to that in which the mechanism is viewed in Fig. 15.

Figure 1:
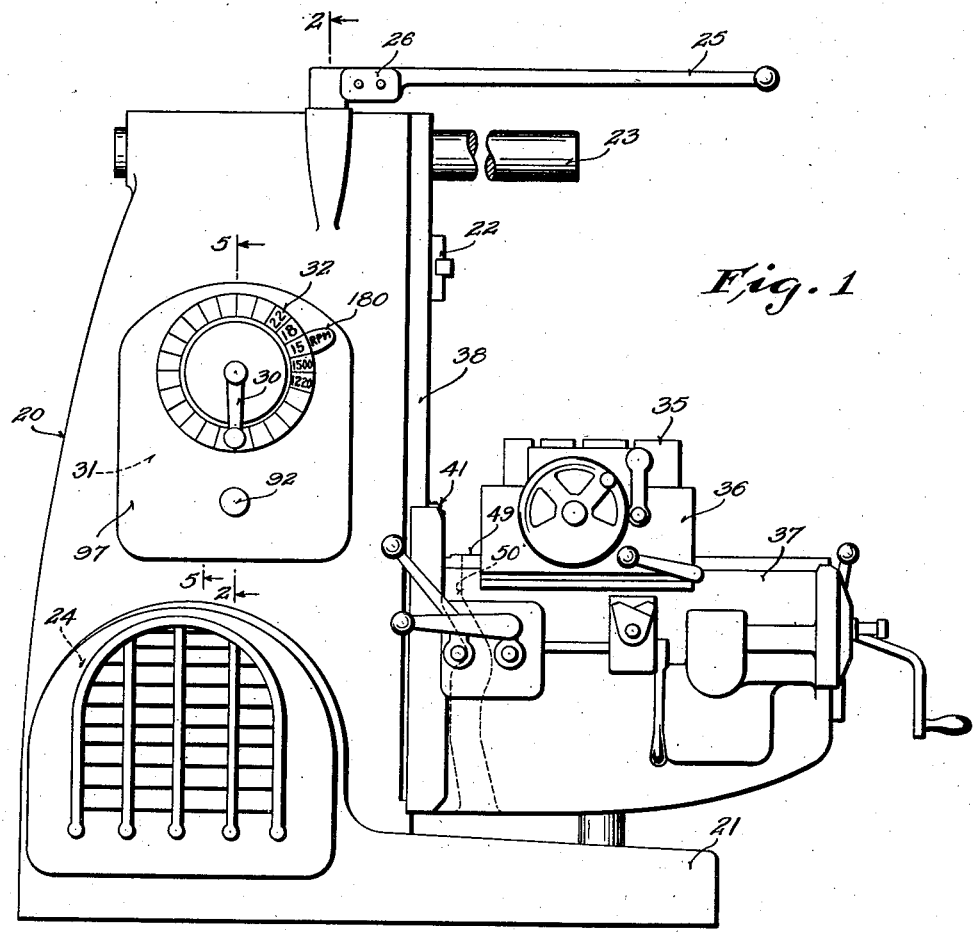
Figure 1 is a view in left side elevation of a milling machine of the knee and column type embodying the principles of this invention.

Referring more particularly to the drawings, the machine shown therein as an example of apparatus constituting a preferred embodiment of the invention, is a milling machine of the horizontal spindle, knee and column type. As shown in Fig. 1, the milling machine comprises essentially an upstanding column 20 mounted on a forwardly projecting base 21, preferably formed integrally with the column and constituting with it the supporting frame of the machine. Near the top of the column there is journaled the usual horizontally disposed tool supporting spindle 22, and above it are slidably mounted overarms 23 for supporting a cutter arbor in well known manner.

The tool spindle 22, and other parts of the machine, are preferably driven by means of an electric motor (not shown) that is mounted in a motor compartment 24 formed within and extending transversely of the lower part of the column 20. Starting or stopping of the spindle 22 is accomplished by actuating a clutch lever or starting lever 25 mounted on the top of the column and that carries a built-in push button switch 26 for starting or stopping the motor in the compartment 24. The speed at which the spindle 22 is operated may be adjusted by means of a speed-selecting lever or crank 30 that functions to shift speed-changing gearing mounted in a gear compartment 31 within the column 20 directly above but separated from the motor compartment 24, the spindle speed being indicated by a speed indicating dial 32.

For supporting a workpiece in cooperating relationship with a cutting tool mounted in the tool spindle 22, there is provided a longitudinally movable work supporting table 35 mounted on a transversely movable saddle 36 that is in turn carried by a vertically movable knee 37 slidably mounted on a vertically disposed bearing surface 38 constituting the front face of the column 20.

To prevent chips or other foreign material from entering between the bearing face 38 on the column and the complementary bearing surface of the knee 37, there is provided a bearing wiper or chip guard 41, shown in Figs. 1, 3, and 4, which is carried by the knee in position to engage the face 38 of the column just above the top of the knee bearing surface. As shown in the enlarged sectional view, Fig. 4, the bearing guard 41 comprises a wiping member 42 extending across the column face 38 and provided with an upwardly and rearwardly projecting lip 43 arranged to closely engage and scrape the column face 38 as the knee 37 is moved upwardly. To retain the wiping strip 42 in position, there are provided a plurality of retaining screws 44 passing loosely through spaced slots 45 in the wiping strip and threaded into the top of the knee bearing structure. The slots 45 permit limited movement of the wiping strip 42 relative to the knee toward or from the bearing face 38, and the strip is frictionally retained in position by means of light spring washers 46 interposed between the heads of the screws 44 and the top of the strip 42.

For urging the lip 43 of the wiping strip 42 into close engagement with the face 38 of the column, there is provided a flat spring member 47 which bears against the exposed forward edge of the strip 42 and is secured to the knee by screws 48 in manner to exert a continuous force upon the strip 42 of sufficient magnitude to overcome the frictional restraining action of the spring washers 46. By this arrangement, the scraping lip 43 of the wiping strip is maintained in close engagement with the bearing surface 38 regardless of changes resulting from slight wear of the strip or of the bearings. Any chips or other foreign matter which may be thrown against the face of the column are scraped off by the scraping lip 43 as the knee moves upward and are prevented from entering between the bearing surfaces.

Horizontal bearing surfaces 49 on the top of the knee 37, upon which the saddle 36 moves toward or from the column, may likewise be provided with chip guards of similar nature. As a further protection to the bearing surfaces 49, provision is made for the disposal of chips or the like which may accumulate on top of the knee. As shown in Figs. 1 and 3, a chip disposal passageway 50 is formed in and extends downward through the knee, in manner more fully described and claimed in Patent No. 1,685,920, issued October 2, 1928 to Edward J. Kearney and entitled "Machine tool knee structure," the chips falling through the passageway being discharged onto the top of the base 21, from which they may be removed periodically.

Figure 2:
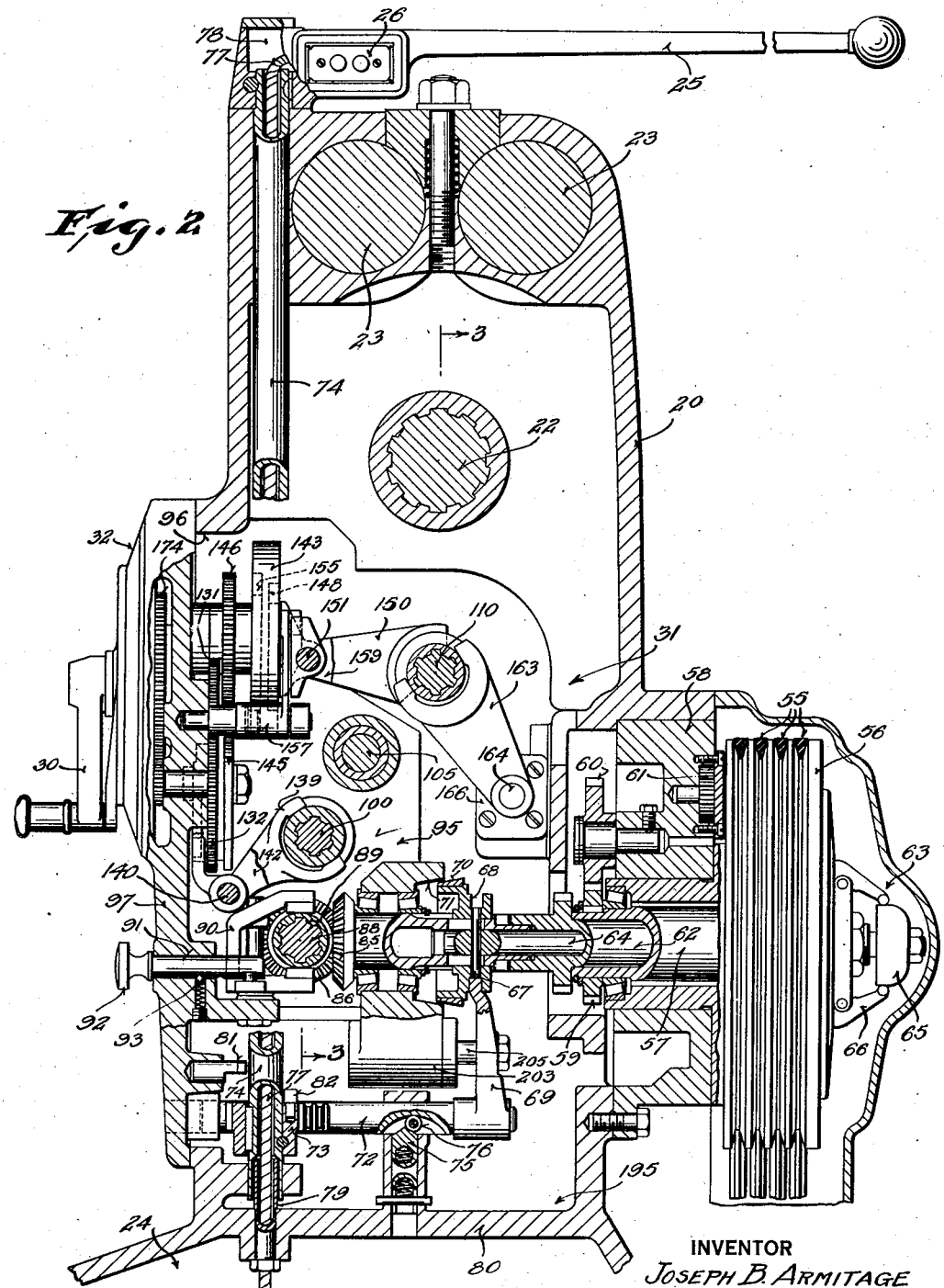
Fig. 2 is a view in vertical cross section of the upper part of the milling machine taken on the planes represented by the line 2—2 in Fig. 1, looking from the front of the machine.

Referring now to Fig. 2 of the drawings, power for rotating the spindle 22 is transmitted from the motor (not shown) in the motor compartment 24 by means of multiple belts 55 that pass over a clutch pulley 56. The pulley 56 is provided with an inwardly extending hub or sleeve 57 which projects through and is rotatably supported in a bracket 58 mounted in the right side of the column 20. The pulley hub or sleeve 57 is provided at its inner end within the gear compartment 31 of the column 20, with a gear wheel 59 which meshes with an idler gear wheel 60 constituting part of the gear train provided for moving the work supporting members at rapid traverse rate and arranged to operate continuously whenever the driving motor is operating. The idler gear 60 also drives a gear pump 61 mounted in the bracket 58 that furnishes oil under pressure for lubricating the working parts within the column of the machine and for actuating hydraulic control mechanism, as more fully explained hereinafter in connection with Fig. 14.

Within the hub 57 of the pulley 56, there is rotatably mounted a hollow main driving shaft 62 formed in two parts for convenience in assembling the machine, and which may be selectively connected to be driven by the pulley by means of a friction clutch 63. For actuating the clutch 63, there is provided a longitudinally movable clutch shifting rod 64 which extends through the hollow shaft 62 and is provided at its outer end with a clutch cone 65 which, when moved to the right as shown in Fig. 2, acts upon clutch engaging fingers 66 to engage the clutch 63 for driving the shaft 62. At its inner end, the clutch shifting rod 64 is connected by means of a pin 67, working in a slot in the inner part of the hollow shaft 62, with a clutch shifting spool 68 which is slidably mounted on the shaft and is engaged by a shifting yoke 69. The shifting spool 68 is provided with a brake cone 70 disposed to engage a stationary braking surface 71 in the column structure, the arrangement being such that when the shifting spool 68 is moved to the left to central position by the shifting yoke 69, the clutch 63 is disengaged to disconnect the driving pulley 56, and upon further movement to the left, the brake cone 70 may be engaged with the braking surface 71 to stop rotation of the main shaft 62 and the mechanism driven from it.

As shown, the clutch shifting yoke 69 is carried on one end of a shifting rack bar 72 having rack teeth that are engaged by a pinion 73 mounted on the lower end of a hollow vertically disposed clutch operating shaft 74. The clutch operating shaft 74 extends upward through the gear compartment 31 and out through the top of the column, and is secured at its upper end to the clutch actuating lever 25. By moving the clutch lever 25 from side to side, the shaft 74 and pinion 73 are rotated and the rack bar 72 is moved longitudinally, thereby shifting the clutch spool 68 by means of the yoke 69 to engage either the clutch 63 or the brake 70 as may be desired. A detent mechanism, including a spring urged plunger 75 projecting upward from the bottom of the gear compartment 31 and cooperating with a detent roller 76 carried by the rack bar 72, is provided to retain the shifting rack 72 in either the clutch engaging or the brake engaging position. If it is desired to change the angular position of the starting lever 25, the lever and the shaft 74 may be lifted upward to disengage the teeth of the pinion 73 from the teeth of the rack 72, whereupon the lever may be turned to the desired position and the pinion teeth re-engaged with the rack teeth.

In order to provide a protected and concealed control connection from the motor controlling switch 26 on the starting lever 25 at the top of the column to the motor in the motor compartment 24 at the bottom of the column, a control cable 77 is led from the switch 26 through a housing 78 formed within the lever 25 into the upper end of the hollow control shaft 74, the cable being carried downward within the shaft through the gear compartment 31. As shown in Fig. 2, the lower end of the hollow shaft 74 is counterbored to telescope over a stationary tube 79 which passes upward through and is fixed in a horizontal dividing wall 80 that separates the gear compartment 31 from the motor compartment 24, the arrangement being such that the telescoping connection between the shaft 74 and the tube 79 prevents lubricating oil in the gear compartment 31 from entering the tube. The control cable 77 passing downward through the control shaft 74 is carried through the tube 79 which serves to convey it from the gear compartment 31 downward into the motor compartment 24 for connecting with the driving motor therein. To prevent the control cable 77 from being twisted off by rotation of the clutch lever 25 through more than one revolution, an abutment or stop member 81 is provided to engage a stop pin 82 on the clutch shifting pinion 73 in such manner that turning of the clutch lever 25 is limited to an angular movement somewhat less than a complete circle.

At the inner end of the inner part of the hollow main driving shaft 62, there is provided a driving bevel pinion 85 which meshes with two similar cooperating bevel pinions 86 and 87, shown in Fig. 3, that are rotatably mounted on a shaft 88 journaled at right angles to the main driving shaft 62, the arrangement being such that the driven pinions 86 and 87 are rotated in opposite directions by the driving pinion 85. A sliding clutch spool 89 is splined on the shaft 88 between the pinions 86 and 87 in a manner to be moved into engagement with either of the pinions to couple it to the shaft 88. The pinions and the sliding clutch spool constitute a reversing mechanism for driving the shaft 88 in either direction to selectively cause the tool carrying spindle 22 to be driven in the desired direction of rotation.

As shown in Fig. 2, the reversing clutch spool 89 is engaged by a shifter yoke 90 in the form of a pivotally mounted bell crank, one arm of which is engaged by a slidable reversing plunger 91 extending through the left side of the machine and provided at its outer end with a reversing knob 92 by means of which it may be moved in or out to move the clutch spool 89 to either of its positions, a spring-pressed detent mechanism 93 being provided for retaining the rod 91 in either its inner or outer position. The bevel pinion 85 on the inner end of the main driving shaft 62 and the cooperating bevel pinions 86 and 87 constitute, in addition to means for reversing the direction of the spindle, a convenient means for turning the direction of power transmission through a right angle, for transmitting power to the spindle 22 from a motor positioned transversely of the column with its shaft disposed at right angles to the axis of the spindle 22.

The shaft 88 is rotatably mounted in a speed box 95 which extends within the gear compartment 31 of the column through an opening 96 in the left side thereof, a cover plate or control panel 97 being formed as part of the speed box and constituting a closure for the opening 96. As shown in Fig. 2, the control panel 97 carries the reversing plunger 91 with its reversing knob 92, and the pivotally mounted reversing yoke 90, as well as the speed selecting control lever 30 and the speed indicating dial 32.

Referring to Fig. 3, the reversing shaft 88 has fixed at one end a pinion 98 which meshes with a gear wheel 99 on a parallelly journaled shaft 100 that constitutes an element of a variable speed device generally designated by the letter "A" and forming one part of the speed changing transmission mechanism for regulating the speed at which the spindle 22 is operated. Splined on the shaft 100 for longitudinal sliding movement is a first gear couplet, comprising gears 101 and 102 joined together and disposed to be selectively meshed respectively with cooperating gears 103 and 104 fixed on a rotatable intermediate or idler shaft 105 that is journaled in the speed box 95 above and parallel with the shaft 100. A second slidably mounted couplet on the shaft 100 includes a gear 106 and a gear 107 disposed to be selectively meshed respectively with cooperating gears 108 and 109 also fixed on the rotatably mounted idler shaft 105. The two couplets on the shaft 100 constitute the primary element of the variable speed device A and they may be shifted to engage each of the four gears in turn with its complementary idler gear on the shaft 105 to drive the idler shaft at any one of four different rates of speed.

Above the shaft 105 and disposed parallel to it is a shaft 110 that is journaled directly in the column 20, and that has splined thereon an axially slidable gear 111 which may be selectively meshed with a gear 112 fixed on the shaft 105. Also slidably mounted on the shaft 110 is a couplet comprising a gear 113 that may be meshed with the idler gear 103 on the shaft 105, and a gear 114 that may be meshed with a cooperating gear 115 also fixed on the idler shaft 105. The sliding gear 111 and the couplet gears 113 and 114 constitute a secondary element of the variable speed device A, and these three gears may be selectively positioned to engage their cooperating gears respectively for transmitting power from the shaft 105 to the shaft 110 at any one of three ratios.

As the primary element of the variable speed device A is capable of four different speed rates, and the secondary element is capable of three rates, it is evident that the shaft 110 may be driven at any one of twelve speed rates by suitably engaging different ones of the sliding gears in the primary and in the secondary elements of the variable speed device with their cooperating gears in the idler gear cluster on the shaft 105. For the sake of clearness in the drawings, all of the sliding gears of the variable speed device A are shown in Fig. 3 in out-of-mesh or neutral position, but it is to be understood that the speed selecting lever 30 and the indicating dial 32 do not provide for an operating condition with the gears in the neutral position, and that for any operating position of the dial, one of the gears of the primary element and one of the gears of the secondary element are in mesh with cooperating gears of the idler cluster.

As shown in Fig. 3, the shaft 110 is disposed parallel with and directly below the cutter spindle 22, and power is transmitted from the shaft 110 to the spindle 22 by means of a range changer generally designated by the letter "B". The range changer B includes a couplet splined on the forward end of the shaft 110 for longitudinal movement relative thereto and constituted by a relatively large range drive gear wheel 120 disposed to be meshed with a relatively small gear wheel 121 fixed on the spindle 22, and a relatively small range drive pinion 122 disposed to be meshed with a large gear wheel 123 fixed on the spindle 22 close to its forward end. The gears of the range changer B are so proportioned that they may be shifted selectively to change the speed of the spindle 22 by a relatively large step to effect operation of the spindle 22 in either a fast range of a slow range. The proportions of the gearing are made such that each of the two ranges includes all of the twelve speed changes which may be effected by the variable speed device A, and consequently the spindle 22 may be operated at any one of twenty-four different speeds by adjusting the variable speed device A and the range changer B cooperatively.

For adjusting the variable speed device A, there is provided a cam actuated gear shifting mechanism constituting a mechanical linkage arranged to be directly operated by the speed-selecting lever 30 and functioning to positively shift the sliding gears of the variable speed device in such manner that the twelve speeds of the series may be effected in predetermined order. The shifting mechanism is so arranged that the gears are shifted in manner to avoid possibility of locking the mechanism by engaging more than one gear of the primary element on the shaft 100 or more than one gear of the secondary element on the shaft 110 with a cooperating gear in the idler cluster on the shaft 105.

Referring particularly to Fig. 5, it will be seen that the speed-selecting lever 30 is fixed on the outer end of a hollow shaft 130 that is journaled in the control panel 97 concentric with the speed indicating dial 32 and that is provided at its inner end with a speed changing pinion 131. The pinion 131 meshes with a gear 132 formed on the periphery of a primary speed changing cam 133 fixed on a stub shaft 134 that is journaled in the cover plate 97. As shown in the detail view, Fig. 10, the cam plate 133 is provided with a cam track or groove 135 cooperating with diammetrically disposed cam followers 136 and 137 respectively.

The cam follower 136 is carried by one end of a shifting arm 138 which is pivotally mounted on the inside of the cover plate 97 and engages at its other end with a shifting fork 139 slidably mounted on a guide rod 140 carried by the speed box 95. As may be seen in Figs. 5 and 3, the shifting fork 139 extends between the gears 101 and 102 of the first couplet in the primary shifting element, and is operative upon movement of the shifting arm 138 by the cam groove 135 acting upon the cam follower 136, to shift the gear 101 or the gear 102 into meshing engagement with the respective cooperating gear 103 or 104 of the idler gear cluster.

The cam follower 137 is carried on one arm of a bell crank shifting lever 141, which is pivotally mounted on the inside of the cover plate 97 and that engages with the end of its other arm a shifting fork 142 also slidably mounted on the guide rod 140. The shifting fork 142 is generally similar to the shifting fork 139 and is engaged between the gears 106 and 107 of the second couplet in the primary shifting element, as shown in Fig. 3, for shifting the gear 106 or the gear 107 into engagement with the gear 108 or the gear 109 respectively of the idler cluster. As may be seen in Fig. 10, the cam groove 135 is provided with a semi-circular section which functions to retain one of the couplets in neutral position while the other couplet is being shifted one way or the other by the remaining non-concentric section of the cam groove, thereby avoiding engagement of both couplets with the idler cluster at the same time.

For shifting the gears of the secondary element in the variable speed device A, there is provided a secondary cam plate 143 mounted on a shaft 144 directly above and parallel with the shaft 134. The secondary cam plate 143 is operatively connected with the primary cam plate 133 by means of intermittent gearing constituting a Geneva movement arranged in such manner that the cam plate 143 is turned through one-third of a revolution at the end of each complete revolution of the cam plate 133. As may be seen in Fig. 10, the cam plate 133 is provided on its periphery beside but spaced from the gear 132 with a discontinuous gear element 145, the teeth of which mesh with a mutilated gear 146 secured to the cam disk 143 and cooperating in manner to effect the desired intermittent movement.

Referring now to Figs. 9, 12, and 13, it will be seen that the secondary cam plate 143 is provided in the inwardly presented face thereof with a cam track or groove 148 that is engaged by a cooperating follower 149. As best shown in the top view, Fig. 13, the cam follower 149 is secured to a shifting fork 150 that is slidably mounted on a guide rod 151 fixed in the speed box 95. As shown, the shifting fork 150 engages a groove 152 of the gear couplet formed by the gears 113 and 114 of the secondary element, for shifting the gears into engagement respectively with the cooperating gears 103 and 115 of the idler cluster.

The other or outer face of the cam plate 143 is also a cam disk, being provided with a cam track or groove 155 cooperating with a cam follower 156. As shown in Figs. 8, 12, and 13, the cam follower 156 is carried on the end of one arm of a bell crank shifting lever 157 pivotally mounted on a pin 158 secured to the speed box 95. The other arm of the bell crank lever 157 engages at its end with a shifting fork 159 also slidably mounted on the guide rod 151 and disposed to engage a groove 160 in the hub of the shiftable gear 111, for shifting the gear into or out of engagement with the gear 112 of the idler cluster.

The gearing interconnecting the speed selecting lever 30 with the cam plates 133 and 143 is so proportioned that for each complete turn of the lever 30, one of the gears in the variable speed device is shifted to effect a change from one speed to the next. Consequently twelve turns of the lever 30 are required to effect all of the twelve combinations available in the variable speed device, and which result from turning the secondary cam plate 143 through one complete revolution.

For shifting the range changer B, there is provided a hydraulically actuated mechanism which is controlled by the speed-selecting lever 30 independently of but in coordinated relationship with the cam actuated shifting mechanism for the variable speed device A. As may be seen in Figs. 2, 3, and 14, the hub of the couplet constituted by the range change gear 120 and the range change pinion 122, is provided with a shifting groove 162 that is engaged by a shifting fork 163. The fork 163 is mounted on the end of a piston rod 164 provided with a piston 165 working in a hydraulic cylinder 166, as best shown in Fig. 14.

Referring again to Fig. 5, the hydraulic shifting mechanism for the range changer B is controlled by means of a range changing valve 170 that is mounted on a stub shaft 171 journaled in the control panel 97 just back of the upper edge of the speed indicating dial 32, and that functions to preselect the adjustment of the range changer. For actuating the range changing valve 170, the shaft 171 is provided with an arm 172 carrying at its end a cam follower 173 which engages a cam groove or track 174 on the inner surface of the speed selecting dial 32, as best shown in Fig. 11. The speed indicating dial 32 is rotatably mounted in the control panel 97 and has secured to its inner side a gear ring 175 which meshes with a cooperating pinion 176 on the outer end of the cam operating shaft 134, whereby the speed indicating dial is operatively connected with the speed selecting lever 30 and the cam groove 174 is coordinated with the cam grooves actuating the shifting mechanism of the variable speed device A.

Since the total number of speeds effected by the variable speed device A and range changer B in cooperation is twenty-four, the gearing connecting the speed selecting crank 30 with the speed indicating dial 32 is of such ratio that it requires twenty-four revolutions of the crank 30 to turn the dial 32 through one complete revolution, the dial being provided with twenty-four numerals constituting speed indicia, which cooperate individually with a stationary indicator 180 to show the speed at which the spindle 22 will operate at any selected setting of the speed changing transmission.

As the range changer B remains in one position throughout one entire series of speeds effected by the variable speed device A, and in its other position throughout another entire series of speeds effected by the variable speed device A, the cam groove 174 in the rotatable speed indicating dial 32 is so shaped, as shown in Fig. 11, that the range changer control valve 170 is held in one position throughout one-half revolution of the speed indicating dial 32 and in its other position throughout the other half revolution of the dial, the two positions being shown in Figs. 6 and 7.

For positioning the speed selecting lever 30 after it has been turned to shift the gearing, the lever is provided with an operating knob and latching device constituted by a spring-pressed locking plunger 182 that is adapted to enter a locating hole 183 in a stationary member constituting part of the control panel 97. To insure that the gears will not be shifted while power is being transmitted through them, and to simplify the shifting operation, a control system is so arranged that the main driving clutch 63 is automatically disengaged as a prerequisite to speed selecting movement of the layer 30. For this purpose, the clutch control is arranged to be actuated by movement of the locking plunger 182 in withdrawing from the positioning hole 183 when the lever 30 is unlatched for a turning movement. In addition to disengaging the main clutch, the unlatching movement of the plunger 182 effects engagement of a slow speed auxiliary drive for the gearing to facilitate shifting of the gears, and also renders the hydraulic shifting mechanism for the range changer B inoperative to prevent shifting of the range changer until after the shifting of the variable speed device has been completed.

As shown in Fig. 5, the locking plunger 182 is provided with a groove 184 that is engaged by one end of a valve operating arm 185 that is disposed within the hollow speed selecting lever 30 and pivotally mounted midway of its length. The other end of the arm 185 engages a groove 186 in a valve stem 187 that is slidably mounted within the hollow speed selecting shaft 130, and is connected by a valve pin 188 with a control valve plunger 189 that slides within a valve casing 190 carried by the control panel. When the locking plunger 182 is moved outwardly to unlatch the lever 30, the valve stem 187 and valve plunger 189 are moved inwardly to the position shown in Fig. 14.

With the locking plunger 182 unlatched and the valve plunger 189 in the inner position preparatory to a shifting movement of the speed selecting lever 30, the various hydraulic control circuits are established as indicated in the control diagram, Fig. 14. As there shown, the actuating fluid, which is ordinarily the lubricating oil, is withdrawn from a sump 195 constituted by the bottom part of the gear compartment 31 in the column, through a conduit 196 by the gear pump 61, which is continuously driven by the pulley 56 as previously explained. From the pump 61, the oil is forced under pressure through a conduit 197 to which is connected a relief valve 198 for relieving excessive pressure in the system. The conduit 197 leads to a port 199 in the valve casing 190 which communicates through a groove 200 in the valve plunger 189 with a port 201 from which a conduit 202 leads to a clutch disengaging or neutralizing cylinder 203. Within the cylinder 203 is a cooperating piston 204 having a piston rod 205 that is connected to the clutch shifting yoke 69.

Assuming that the machine is running when the locking plunger 182 is withdrawn prerequisite to effecting a speed changing movement, the main clutch 63 being engaged, the clutch shifting piston 204 would be at the right end of the cylinder 203, and oil under pressure in the conduit 202 would flow through a circumferential port 207 in the wall of the cylinder 203, into a port 208 in the piston and thence through a longitudinal passageway 209 therein to the right end of the cylinder, thereby exerting force to move the piston to the left to disengage the main clutch 63. Movement of the piston 204 to the left takes place in opposition to the force exerted by the detent mechanism which tends to retain the clutch 63 in engagement, and this resistance continues until the detent roller 76 in the rack bar 72 passes over the center of the spring-pressed plunger 75, whereupon the detent mechanism will urge the piston 204 to the left, moving the piston port 208 out of register with the cylinder port 207 and into register with a cylinder port 212 open to the atmosphere, thus cutting off the source of pressure to the right end of the cylinder and permitting movement of the piston to the left.

To prevent the detent mechanism from moving the clutch shifting mechanism into brake engaging position, the piston 204 is provided with a port 213 which moves into register with the circumferential cylinder port 207, whereupon oil under pressure passes through a longitudinal passageway 214 to the left end of the cylinder, building up sufficient pressure therein to oppose the spring urged detent plunger 75 and to prevent engagement of the brake cone 70 with the stationary braking surface 71. As the piston 204 is moved to the right by the pressure building up in the left end of the cylinder, the piston port 213 moves out of register with the cylinder port 207 and into register with a cylinder port 215, through which the oil may escape. By this arrangement, a hydraulic lock is effected and the piston 204 is held in a position in which the clutch 63 is disengaged and the brake cone 70 is held out of engagement with the braking surface 71.

The means for effecting slow speed rotation of the transmission mechanism to facilitate gear shifting embodies the principles described and claimed in the co-pending application of Walter M. Pohl and Joseph B. Armitage, filed January 27, 1933, Serial No. 653,872, and entitled "Machine tool transmission and control," which issued March 8, 1938, as Patent No. 2,110,173 and was reissued April 23, 1940, as Re. 21,434. As the slow speed auxiliary drive mechanism should not be engaged until after both the main clutch and the brake are moved to disengaged position by the piston 204, a hydraulic control circuit for engaging the auxiliary drive is arranged to become effective only after the piston 204 has moved to the neutralizing position, as shown in Fig. 14. As shown, the piston 204 is provided with a valve port 219 which establishes communication between the cylinder port 207 and a cylinder port 220 when the piston is in the neutralizing position with both the clutch and the brake disengaged. From the cylinder port 220, the oil flows through a conduit 221 into a cylinder 222 having a cooperating piston 223. Pressure in the cylinder 222 forces the piston 223 to the right against a clutch operating plate and plunger 224, forcing the plunger to the right against the pressure of a spring 225 to engage a friction clutch 226 constituting part of the slow speed auxiliary drive mechanism.

As shown in Fig. 14, power for turning the auxiliary drive mechanism is derived from the gear wheel 59 on the constantly rotating pulley sleeve 57 that meshes with and drives a gear wheel 230 which is rotatably mounted on a shaft 231 concentric with the friction clutch 226. The gear wheel 230 is provided with an eccentrically disposed hub or sleeve 232 shown in transverse section in Figs. 15 and 16 (sheet 1), upon which is rotatably mounted a planetary gear couplet 233 in manner to be gyrated or revolved bodily in a circular path about the axis of the shaft 231 when the gear 230 is rotated.

The planetary gear couplet 233 includes a gear 234 and a gear 235. As may best be seen in Fig. 15, the gear 234 meshes with and rolls within a stationary internal gear 237, which is attached to the bracket 58 by cap screws 238. As shown in Fig. 16, the planetary gear 235 of the couplet 233 meshes with and rolls within an internal gear 240 which is keyed to the shaft 231. The ratio of the number of teeth in the internal gears to the number of teeth on the planetary gears is such that a differential action occurs when the planetary gear couplet is gyrated within the internal gears, with the result that the internal gear 240 on the shaft 231 is caused to progress relative to the stationary internal gear 237, thereby turning the shaft 231, but at greatly reduced speed.

As may be seen in the drawing, one element 241 of the clutch 226 is keyed to the shaft 231 and another element 242, constituting an enclosing casing, is provided on its periphery with gear teeth 243 constituting a gear wheel that may be coupled to the shaft 231 by engaging the clutch 226, in manner to rotate with it at slow speed. The gear teeth 243 mesh with a cooperating gear 244 that is secured on the main driving shaft 62 and that operates to turn the shaft and the gearing of the variable speed device at a low speed when the clutch 226 is engaged, to facilitate engagement of the sliding gears of the variable speed device A when they are shifted by the cam actuated gear shifting mechanism. If the machine is running at the time that the locking plunger 182 is withdrawn to initiate a speed selecting movement, the tool spindle may continue turning after the main clutch moves to disengaged position. In this event, the auxiliary friction clutch 226, upon being engaged, functions first as a brake to quickly retard the spindle driving train to the slow speed for facilitating gear shifting.

In changing from one speed to another, the speed selecting lever 30 may be turned through as many complete revolutions as may be necessary to turn the dial 32 a sufficient distance to move the indicia representing the desired speed into register with the indicator 180. As the lever 30 is turned, the sliding gears of the variable speed device A are moved successively into and out of mesh by the cam actuating mechanism while they are being turned slowly by the auxiliary slow speed drive mechanism, to prevent the gears from engaging tooth on tooth, and likewise the range changing valve 170 may be turned from one position to the other by the cam groove 174 in the dial 32.

When the desired speed has been selected by the lever 30, the locking pin 182 is again engaged in the positioning hole 183, the latching movement resulting in the valve 189 being moved to the left within the valve casing 190 to the position shown in Fig. 5. With the valve 189 in the left position, a land 246 of the valve is interposed between the pressure port 199 and the port 201 leading to the clutch disengaging cylinder, the port 201 then being open to the atmosphere as shown in Fig. 5. The fluid under pressure in the slow speed clutch engaging cylinder 222 then escapes through the conduit 221, valve ports 220, 219, and 207, and through the conduit 202 and the port 201, thereby permitting the spring 225 to disengage the clutch 226, thus disconnecting the auxiliary slow speed drive. Likewise, the oil under pressure in the left end of the cylinder 203 escapes through the piston passageway 214, the port 213, and the annular cylinder port 207 into the conduit 202 and out through the port 201, permitting the spring detent mechanism to move the piston 204 to the left, thereby engaging the brake cone 70 with the brake member 71 and retaining the starting lever 25 in the stop position.

With the valve 189 in the left position, as shown in Fig. 5, the valve groove 200 establishes communication from the pump 61, through the conduit 197, and the pressure port 199, to a port 249 in the valve casing from which a conduit 250 leads to a port 251 in a valve plate 252, which cooperates with the range changing valve 170. With the range changing valve 170 in the position shown in Figs. 14 and 7, oil under pressure from the port 251 passes through an arcuate groove 253 in the valve 170 to a port 254, from which a conduit 255 leads to the left end of the range changing cylinder 166, exerting pressure therein to force the piston 165 to the right, as shown in Fig. 14, and moving the pinion 122 of the range changer B into mesh with the large gear wheel 123 on the spindle 22, as shown in Fig. 3, for driving the spindle in the low speed range. Should the teeth of the pinion 122 fail to mesh with the teeth of the gear wheel 123 because of engaging end to end, no harm will result, since the pressure will be maintained upon the piston 165 until such time as the gears are turned to meshing position. As the gears move into mesh, oil in the right end of the cylinder 166 escapes through a conduit 256 which leads to a port 257 in the valve plate 252 and thence through another arcuate groove 258 in the valve 170 to an exhaust port 259, from which it escapes through a conduit 260. When the piston arrives at the end of its stroke, it uncovers a port 262 at the middle of the cylinder, from which the oil under pressure in the cylinder escapes through a conduit 263 that may lead to the lubricating system of the machine.

If the range changing valve 170 is turned by the cam groove 174 of the indicating dial 32 during a shifting operation to the position shown in Fig. 6, the oil under pressure entering the valve through the port 251 will flow through the groove 258 into the port 257 and thence through the conduit 256 to the right end of the cylinder 166 and will move the piston 165 to the left to the position indicated in dotted lines in Fig. 14, thereby meshing the gear 120 of the range changer B with the gear 121 on the spindle 22 for driving the spindle in the high speed range. Oil in the left end of the cylinder 166 will then be forced out through the conduit 255 and the port 254 into the valve groove 253 which connects with the exhaust port 259 for exhaust through the conduit 260. At the end of its stroke to the left, the piston 165 again uncovers the port 262 to permit the oil to flow into the conduit 263.

After the sliding gears of the variable speed device A have been shifted by the speed selecting device A, and the gears of the range changer B have been subsequently shifted hydraulically in accordance with the setting of the valve 170, the machine may be placed in operation at the selected speed by moving the starting lever 25 to re-engage the main friction clutch 63.

From the foregoing explanation of the construction and operation of a preferred embodiment of the invention, it is apparent that there has been provided an improved milling machine having a speed changing transmission mechanism capable of rapidly and positively effecting a change in speed without danger of injury occurring to the mechanism through carelessness in performing the shifting operation.

Although only one embodiment of this invention has been shown and described as exemplary of the manner in which it may be practiced, it will be apparent to others skilled in the art to which the invention relates that various modifications of the structure herein described in detail may be effected without departing from the spirit and scope of the invention as defined in the subjoined claims.

I claim as my invention:

1. In a transmission mechanism, the combination with a manually operated speed changing device and a power operated speed changing device arranged in series relationship, of a manually actuated control element connected to shift said manually operated speed changing device and operative to pre-select the mode of operation of said power operated speed changing device, means associated with said control element and operative to prevent actuation of said power operated speed changing device while said manually operated speed changing device is being shifted, and means associated with said control element and effective to actuate said power operated speed changing device in accordance with the pre-selected mode of operation upon completion of shifting movement of said control element.

2. In a speed changing transmission and control mechanism for a machine tool, the combination with a variable speed device and a range changer arranged in series relationship, of a speed selecting device operative upon speed selecting movement to adjust said variable speed device and to pre-select an adjustment for said range changer, and means operative subsequent to completion of a speed selecting movement of said speed selecting device to effect adjustment of said range changer in accordance with the adjustment pre-selected during said speed selecting movement.

3. In a milling machine speed changing transmission mechanism, the combination with a plurality of shiftable gears, of hydraulically actuated means for shifting some of said gears, mechanically actuated means for shifting others of said gears, a control member operatively connected to directly actuate said mechanical gear shifting means, and hydraulic control means actuated by said control member and operative to control said hydraulically actuated gear shifting means, whereby should said hydraulically shifted gears fail to mesh shifting pressure will be maintained upon them without interfering with movement of said control member.

4. In a speed changing transmission and control mechanism for a machine tool, the combination with a variable speed device and a range changer arranged in series relationship, of a speed selecting device operative upon speed selecting movement to adjust said variable speed device and to pre-select an adjustment for said range changer, and means operative pre-requisite to a speed selecting movement of said selecting device to prevent adjustment of said range changer by said speed selecting device, and operative subsequent to a speed selecting movement to effect adjustment of said range changer in accordance with the adjustment pre-selected by said speed selecting device.

5. In a power transmission mechanism for a machine tool, the combination with variable speed gearing and range changing gearing, of a single control element arranged to shift both said variable speed gearing and said range changing gearing in predetermined sequence to effect a selected one of a plurality of speeds of operation, mechanical linkage operatively connecting said control element to shift said variable speed gearing, and a hydraulic actuating device operatively connecting said control element to shift said range changing gearing, said hydraulic actuating device being arranged to exert pressure to mesh said range changing gearing without interfering with movement of said mechanical linkage in meshing said variable speed gearing.

6. A slow speed driving mechanism for the speed changing transmission of a machine tool, comprising a driving element normally operating at relatively high speed, a gyratory gear couplet arranged to be gyrated by said driving element, a stationary internal gear meshing with one gear of said gyratory couplet, a rotatably mounted internal gear meshing with the other gear of said gyratory couplet, the ratios of said internal gears and said gyratory couplet gears being such that said rotatable internal gear is caused to progress at a relatively slow rate of speed, and means including a friction clutch disposed to selectively connect said rotatable internal gear to the machine tool transmission for rotating it slowly to facilitate gear shifting.

7. In a machine tool provided with a speed-changing transmission mechanism having a plurality of parts, the combination with a single speed-selecting member for controlling two of said parts, of means operative pre-requisite to a speed-selecting movement of said member to render one part of said transmission mechanism non-responsive to movement of said member, and means operative subsequent to a speed-selecting movement of said member to effect response of said previously non-responsive part of said transmission mechanism in accordance with an adjustment thereof pre-selected by the speed-selecting movement of said member.

8. In a machine tool, the combination with a frame carrying a movable element and a motor for driving said element, of a clutch disposed to selectively connect said motor to drive said movable element, a hollow lever operatively connected to control said clutch, a manually operable switch carried by said clutch lever, and an electrical control cable extending from said switch through said hollow lever and operatively connected to control said motor.

9. A machine tool comprising a frame, a movable working element carried by said frame, a motor carried by said frame for actuating said movable element, means operatively connecting said motor to said element including a clutch, a hollow clutch operating shaft, a manually operable hollow clutch lever carried by said hollow clutch shaft and operatively connected thereby to actuate said clutch, a manually operable electric switch carried by said hollow clutch lever, and an electrical control cable extending from said switch through said hollow clutch lever and shaft and operatively connected to control said motor.

10. In a milling machine having a hollow column provided with a dividing wall disposed to define at one side thereof a motor compartment and at the other side thereof a gear compartment, a tubular control shaft extending from the exterior of said column into said gear compartment, and movable to actuate apparatus therein, a tubular member extending through said dividing wall and connecting said tubular control shaft with said motor compartment, a control switch carried by said control shaft outside of said column, and an electrical control cable extending from said switch through said tubular control shaft and said tubular connecting member into said motor compartment.

11. In a machine tool speed changing mechanism, the combination with a variable speed device and a range changing device cooperatively arranged to control the speed of rotation of a driven element, of a speed selecting control member for adjusting both said variable speed device and said range changing device, mechanically actuated means operatively connecting said speed selecting control member to said variable speed device, and hydraulically actuated means operatively connecting said control member to said range changing device, whereby coordinated control of said cooperating devices in the speed changing mechanism is effected in such manner that should said hydraulically actuating range changing device fail to function actuating pressure will be maintained upon it without interfering with the movement of said speed selecting control member.

12. In a machine tool transmission mechanism, the combination with a variable speed mechanism and a range changing mechanism constituting a speed changing apparatus, of a speed indicating device, a speed selecting lever, mechanism operatively connecting said speed selecting lever to said variable speed mechanism and to said speed indicating device, and hydraulic actuating means operatively connecting said speed selecting lever to said range changing mechanism, whereby said variable speed mechanism, said range changing mechanism and said speed indicating device may be operated in predetermined relationship to establish a desired speed and to indicate the established speed, said hydraulically actuating means functioning to exert a continuous shifting pressure upon said range changing mechanism should it resist adjustment without interfering with further operation of said speed selecting lever.

13. In a machine tool transmission and control mechanism, the combination with a speed changing mechanism and driving means therefor including a disconnecting clutch, of hydraulic actuating mechanism for adjusting said speed changing mechanism, hydraulic actuating mechanism for actuating said clutch, a speed selecting lever including a latching device, a valve disposed to be operated coincidentally with said latching device and operative upon unlatching movement thereof to effect disengagement of said clutch and to render inoperative said hydraulic actuating mechanism for adjusting said speed changing mechanism, and a selector valve disposed to be actuated by said speed selecting lever to pre-select an adjustment of said speed changing mechanism, said adjustment becoming effective upon latching movement of said latching device.

14. In a machine tool transmission and control mechanism, the combination with a speed changing mechanism including a variable speed device and a range changing device, and driving mechanism therefor including a disconnecting clutch, of a speed selecting lever, means operative upon speed selecting movement of said lever to adjust said variable speed device and to pre-select an adjustment of said range changing device, means operative by said speed selecting lever prior to speed-selecting movement thereof to disengage said clutch and to render said range-changing device non-responsive to said speed-selecting movement, and means operative by said speed selecting lever after speed-selecting movement thereof to effect adjustment of said range changing device in accordance with the adjustment pre-selected by said speed-selecting movement.

15. In a speed changing transmission mechanism for a machine tool, the combination with a source of power, a disconnecting clutch, a variable speed device, and a range changing device arranged in series relationship; of a speed selecting element for controlling said speed changing transmission mechanism, a latching device disposed to retain said element in any one of several speed determining positions, mechanism operatively connected with said speed selecting element and effective to adjust said variable speed device upon speed-selecting movement of said element, mechanism for adjusting said range changing device, means operative upon speed-selecting movement of said element to pre-select an adjustment of said range changing device to be subsequently effected by said adjusting mechanism, means operative upon unlatching movement of said element latching device to disengage said clutch and to render said range changing mechanism non-responsive to speed-selecting movement of said element, and means operative upon latching movement of said element latching device to actuate said mechanism for adjusting said range changing device to effect adjustment thereof in accordance with the pre-selected adjustment established by said speed-selecting element.

16. In a machine tool speed changing transmission mechanism, the combination with a source of power, a clutch, a variable speed device, and a range changer; of hydraulically actuated means for disengaging said clutch, hydraulically actuated means for adjusting said range changer, a valve disposed to control said range changer adjusting means, a speed selecting control device arranged upon speed selecting movement thereof to directly actuate said variable speed device and to position said control valve for predetermining a subsequent adjustment of said range changer, and a valve operative upon initiating a speed-selecting movement of said speed selecting control device to connect said hydraulically actuated means for disengaging said clutch and to disconnect said hydraulically actuated means for adjusting said range changer, said valve being operative upon completing a speed-selecting movement of said speed selecting control device to connect said hydraulically actuated means for adjusting said range changer to thereby effect adjustment of said range changer in accordance with the previously selected position of said range changer control valve.

17. In a machine tool transmission and control mechanism, the combination with a driven element, speed changing mechanism including a range changer and a variable speed device connected in series relationship to drive said driven element, a clutch disposed to selectively drive said variable speed mechanism, and a source of power connected to drive said clutch; of hydraulically actuated means arranged to effect disengagement of said clutch, hydraulically actuated means arranged to adjust said range changer, a valve disposed to control the adjustment of said range changer by said hydraulically actuated means, a speed selecting and indicating mechanism including a control lever and a speed indicating dial actuated in accordance with movements of said lever, a latching device associated with said lever to latch said speed-selecting mechanism in any one of several positions corresponding to the several speeds of which said speed changing mechanism is capable, a valve associated with said latching device and operative upon unlatching movement thereof to actuate said hydraulic clutch disengaging means to disengage said clutch, means associated with said control lever and operative upon speed-selecting movement thereof to adjust said variable speed device and to adjust the position of said range changer control valve, and a valve associated with said latching device and operative upon latching movement thereof to actuate said hydraulic range changer adjusting means to adjust said range changer in accordance with the pre-selected position of said range changer control valve.

18. In a transmission and control mechanism for a machine tool, the combination with a variable speed device and a range changer connected in series relationship, of a speed-selecting member having a latching device arranged to latch said member in any one of several positions corresponding to the several speeds that may be effected by said variable speed device and said range changer cooperatively, means responsive to unlatching movement of said latching device to lock said range changer to prevent adjustment thereof, means responsive to movement of said speed selecting member to adjust said variable speed device and to pre-select an adjustment of said range changer, and means effective upon subsequent latching movement of said latching device to actuate said range changer in accordance with the adjustment pre-selected by said speed-selecting member.

19. In a machine tool having an adjustable rate changing power transmission mechanism including shiftable gearing, the combination with a main driving means including a main clutch engageable to drive said mechanism at normal operating speed, of an auxiliary slow speed driving means including an auxiliary friction clutch selectively engageable when said main clutch is disengaged to effect a direct connection with said mechanism to drive it at slow speed, and a hydraulically actuated control system operative prior to a gear shifting adjustment to disengage said main clutch and to engage said friction clutch, said friction clutch functioning as a brake in manner to reduce the speed of said mechanism quickly to a low rate adapted to facilitate shifting of said gearing.

20. In a machine tool having an adjustable rate changer including shiftable gearing, the combination with main driving means including a main clutch selectively engageable to drive said gearing at normal operating speed, of an auxiliary slow speed driving means including an auxiliary friction clutch, and a control system arranged to engage said auxiliary friction clutch upon said main clutch being disengaged, said friction clutch functioning to retard said gearing quickly from its normal operating speed and to drive it at a low rate of speed to facilitate gear shifting.

21. In a machine tool having an adjustable power transmission mechanism, a primary driving means selectively engageable to drive said transmission mechanism at normal operating speed, an auxiliary slow speed driving means operative to drive said transmission mechanism at a speed adapted to facilitate adjustment thereof, a friction clutch selectively engageable to connect said auxiliary driving means directly to said power transmission mechanism, and a control system operative to disengage said primary driving means and engage said friction clutch in such manner that said friction clutch functions as a brake to reduce the speed of said power transmission mechanism promptly to the slow speed for facilitating adjustment.

22. In a machine tool having an adjustable power transmission mechanism, a primary driving means selectively engageable to drive said transmission mechanism at normal operating speed, an auxiliary slow speed driving means operative to drive said transmission mechanism at a speed adapted to facilitate adjustment thereof, a friction clutch selectively engageable to connect said auxiliary driving means directly to said power transmission mechanism in such manner that said friction clutch functions as a brake to reduce the speed of said power transmission mechanism promptly to the slow speed for facilitating adjustment, and control means disposed to adjust said power transmission mechanism and operative prerequisite to an adjustment of said mechanism to disengage said primary driving means and to engage said auxiliary friction clutch automatically.

23. In a machine tool having an adjustable power transmission mechanism, a primary driving means selectively engageable to drive said transmission mechanism at normal operating speed, an auxiliary slow speed driving means operative to drive said transmission mechanism at a speed adapted to facilitate adjustment thereof, a friction clutch selectively engageable to connect said auxiliary driving means directly to said power transmission mechanism in such manner that said friction clutch functions as a brake to reduce the speed of said power transmission mechanism promptly to the slow speed for facilitating adjustment, control means disposed to adjust said power transmission mechanism and operative prerequisite to an adjustment of said mechanism to disengage said primary driving means and to engage said auxiliary friction clutch automatically, and another control device for selectively engaging or disengaging said primary driving means independently of said auxiliary friction clutch.

24. A slow speed driving mechanism for turning the speed changing transmission of a machine tool to facilitate adjustment thereof, comprising a driving element normally operating at relatively high speed and selectively connectible to drive said speed changing transmission at normal speed, a gear reduction train connected to be driven by said driving element and operative to provide a relatively slow rate of speed, and a friction clutch disposed to connect said gear reduction train directly to said speed changing transmission for checking its speed and for rotating it slowly while it is being adjusted.

25. In a milling machine having a column and a tool supporting spindle mounted horizontally in said column longitudinally thereof, the combination with a driving shaft disposed crosswise of said column and transversely of said spindle, of transmission means including a bevel gear reversing mechanism operatively connecting said driving shaft to said spindle, said bevel gear reversing mechanism functioning both for selectively reversing the direction of rotation of said spindle and for transmitting power through a right angle from said transverse driving shaft to said spindle.

26. In a machine tool provided with a plurality of speed changing transmission mechanisms arranged in series relationship, a single speed-selecting member for controlling two of said speed changing mechanisms, means operative prerequisite to a speed-selecting movement of said member to render one of said mechanisms non-responsive to said speed-selecting movement and to cause slow rotation of another of said mechanisms to facilitate adjustment thereof, and means operative subsequent to the speed-selecting movement of said member to effect adjustment of said previously non-responsive mechanism in accordance with the position thereof pre-selected by the speed-selecting movement of said member.

27. In a machine tool transmission and control mechanism, the combination with a speed changing mechanism and driving mechanism therefor including a disconnecting device, of a speed selecting control mechanism for adjusting said speed changing mechanism, a slow speed driving mechanism to facilitate said speed changing adjustment, a friction clutch disposed to connect said slow speed driving mechanism directly to said speed changing mechanism, and means operative by said speed selecting control mechanism to disengage said disconnecting device and to engage said slow speed friction clutch to connect said slow speed mechanism directly to said speed changing mechanism, prior to a speed-selecting adjustment thereof, whereby said speed changing mechanism may be disconnected from its driving mechanism and its speed promptly reduced by engagement of said friction clutch to that at which the subsequent speed-selecting adjustment is facilitated.

28. In a machine tool transmission and control mechanism, the combination with a speed changing mechanism including a variable speed device and a range changing device, and driving mechanism therefor including a disconnecting clutch and a slow speed driving device, of a speed-selecting lever, means operative by said speed-selecting lever prerequisite to a speed-selecting movement thereof to disengage said clutch and engage said slow speed driving device and to render said range-changing device non-responsive to said speed-selecting movement, means operative upon speed-selecting movement of said lever to adjust said variable speed device while it is turning slowly and to pre-select an adjustment of said range changing device, and means operative by said speed-selecting lever subsequent to a speed-selecting movement thereof to disengage said slow speed driving device and to effect actuation of said range changing device in accordance with the adjustment thereof pre-selected by said speed-selecting movement.

29. In a machine tool speed changing transmission mechanism, the combination with a source of power, a clutch driven by said source of power, a variable speed device and a range changer connected to be driven by said clutch, and a slow speed driving device, of hydraulically actuated means for adjusting said range changer, a valve disposed to control said range changer adjusting means, a speed selecting control device arranged to actuate said variable speed device directly and to position said control valve for predetermining a subsequent adjustment of said range changer, and means operative upon initiating a speed-selecting movement of said control device to effect disengagement of said clutch and engagement of said slow speed driving device and to disconnect said hydraulically actuated means for adjusting said range changer, said means being operative upon completion of a speed-selecting movement of said control device to disengage said slow speed driving device and to connect said hydraulically actuated means for adjusting said range changer to thereby effect adjustment of said range changer in accordance with the previously selected position of said control valve.

30. In a transmission and control mechanism for a machine tool, the combination with a variable speed device and a range changer connected in series relationship, of a speed-selecting member having a latching device arranged to latch said member in any one of several positions corresponding to the several speeds that may be effected by said variable speed device and said range changer cooperatively, means responsive to unlatching movement of said latching device to cause slow rotation of said variable speed device and to lock said range changer to prevent adjustment thereof, means responsive to movement of said speed selecting member to adjust said variable speed device while it is rotating slowly and to pre-select an adjustment of said range changer, and means effective upon subsequent latching movement of said latching device to discontinue slow rotation of said variable speed device and to actuate said range changer in accordance with the adjustment pre-selected by said speed-selecting member.

31. In a speed changing transmission and control mechanism for a machine tool, the combination with a variable speed device and a range changer arranged in series relationship, of a speed selecting device operative upon speed selecting movement to adjust said variable speed device and to pre-select an adjustment for said range changer, means operative prerequisite to a speed selecting movement of said selecting device to turn said variable speed device slowly for facilitating adjustment thereof, and means operative to prevent adjustment of said range changer until after said speed selecting movement has been completed.

32. In a milling machine speed changing transmission mechanism having a plurality of shiftable gears, mechanically actuated means for shifting some of said gears, a slow speed driving mechanism for turning said gears to facilitate shifting thereof, hydraulically actuated means for shifting others of said gears, and a control member operatively connected to actuate said mechanical gear shifting means and to control said hydraulically actuated gear shifting means, whereby should said hydraulically shifted gears fail to mesh shifting pressure may be maintained upon them without interfering with further operation of said control member.

33. In a rate change and control mechanism the combination of first and second rate change devices in serial driving relation and collectively adjustable to effect a variety of rate change driving ratios, a speed selector adjustable to different positions respectively corresponding to different of said ratios, a first shifter means controlled from said selector for directly adjusting said first rate change device in accordance with the position of said selector, and a second shifter means controlled from said selector for adjusting said second rate change device in accordance with the position of said selector, said second shifter means including means delaying operation thereof until completion of the operation of said first shifter means.

34. A machine tool power transmission and control mechanism, comprising a plurality of rate changing devices, a rate selector movable to effect direct adjustment of one of said rate changing devices, and means responsive to said rate selector and operative to effect delayed adjustment of another of said rate changing devices in accordance with the final position of said rate selector.

35. A machine tool power transmission and control mechanism, comprising a plurality of rate changing devices, a manually operable rate selector movable to effect direct manual adjustment of one of said rate changing devices, and power operated means responsive to said rate selector and functioning to effect delayed adjustment of another of said rate changing devices in accordance with the final position of said rate selector.

36. A machine tool power transmission and control mechanism, comprising a plurality of rate changing devices, a single selector operative to effect coordinated adjustment of said rate changing devices, a shifter directly operated by said selector and functioning to shift one of said rate changing devices directly in accordance with movement of said selector, a power operated shifter arranged to effect power shifting of another of said rate changing devices, and a delayed action control device operative in response to movement of said selector and functioning to energize said power operated shifter subsequent to completion of direct shifting of said first rate changing device for effecting delayed power shifting of said other rate changing device in accordance with the position of said selector.

37. A machine tool power transmission and control mechanism, comprising a plurality of rate changing devices, a manually operable rate selector movable to effect direct manual adjustment of one of said rate changing devices, and power operated means responsive to said rate selector and functioning to effect power adjustment of another of said rate changing devices.

38. A machine tool power transmission and control mechanism, comprising a speed changing device, a range changing device cooperating with said speed changing device to provide for operation in a low or a high series of speeds, a single speed selector disposed to effect direct adjustment of said speed changing device, and a power actuated shifter responsive to said selector and disposed to effect power adjustment of said range changing device in coordination with adjustment of said speed changing device, whereby operation of said transmission mechanism may be effected in either speed series.

39. A machine tool power transmission and control mechanism, comprising a speed changing device, a range changing device cooperating with said speed changing device to provide for operation in a low or a high series of speeds, a single speed selector disposed to effect direct adjustment of said speed changing device, a power actuated shifter disposed to effect power adjustment of said range changing device, and control means responsive to said selector and operative subsequent to completion of adjustment of said speed changing device to effect coordinated power adjustment of said range changing device in accordance with the setting of said selector.

40. In a machine tool, a speed changing transmission mechanism including a plurality of variable speed devices arranged in series relationship, a single speed-selecting element for controlling said variable speed devices, said element being operatively connected to adjust one of said variable speed devices directly, and means interoperative with a speed-selecting movement of said element to pre-select an adjustment for another of said variable speed devices and to cause slow rotation of said first variable speed device while adjusting it.

41. In a machine tool, a speed changing transmission mechanism including a plurality of variable speed devices arranged in series relationship, and a single speed-selecting element movable to adjust one of said variable speed devices and simultaneously to pre-select an adjustment for another of said variable speed devices.

42. In a machine tool, a speed changing power transmission mechanism including a plurality of variable speed devices arranged in series relationship, a clutch disposed to actuate said transmission mechanism selectively, a brake engageable to stop said transmission mechanism, a single speed-selecting element disposed to control said variable speed devices and functioning directly to adjust one of them, means interoperative with movement of said speed-selecting element to disengage said clutch and said brake and to pre-select an adjustment for another of said variable speed devices while causing slow rotation of said transmission mechanism during adjustment of said first variable speed device, and means operative subsequent to movement of said speed-selecting element to effect the preselected adjustment of said variable speed device and to engage said brake.

43. In a speed changing transmission and control mechanism for a machine tool, a plurality of variable speed devices arranged in series relationship, a speed selecting element operative to adjust one of said variable speed devices directly and to pre-select an adjustment for another of said variable speed devices, and means interoperative with a speed-selecting movement of said selecting element to turn said transmission mechanism slowly for facilitating adjustment thereof.

44. In a speed changing transmission and control mechanism for a machine tool, a plurality of variable speed devices arranged in series relationship, power actuated means disposed to adjust one of said variable speed devices, and a single speed-selecting element operative to effect direct adjustment of another of said variable speed devices and to control said power actuated adjusting means, the arrangement being such that should said power actuated variable speed device resist adjustment, said speed-selecting element may be moved to complete the adjustment of said other variable speed device without interference.

45. In a speed changing transmission and control mechanism for a machine tool, the combination with a manually actuated speed changing device and a power actuated speed changing device, of a manually actuated speed-selecting element operative upon speed-selecting movement to adjust said manually actuated speed changing device directly and to pre-select an adjustment for said power actuated speed changing device, and means operative to energize said power actuated speed changing device for adjusting it in accordance with the adjustment thereof pre-selected by said speed-selecting element.

46. In a machine tool having an adjustable rate changing power transmission mechanism, the combination with main driving means selectively engageable to drive said mechanism at normal operating speed, of an auxiliary slow speed driving means engageable automatically upon disengagement of said main driving means and operative as to brake to reduce the speed of said transmission mechanism quickly to a low rate adapted to facilitate adjustment of said mechanism.

47. In a machine tool, the combination with a power transmission mechanism comprising serially arranged shiftable rate change devices and clutch means operative to interrupt said transmission mechanism, of fluid operable means for adjusting said clutch means and for shifting one of said rate change devices, a rate selector including a chart and an indicator movable relative to said chart, a source of pressure fluid for operating said fluid operable means, valve means operable to alter the connection of said pressure source and fluid operable means in manner to shift said rate change device in accordance with the relative position of said chart and indicator means, and other control means operative prerequisite to relative movement of said chart and indicator means to alter the connection of said pressure source and fluid operable means to shift said clutch to interrupting position.

48. In a machine tool transmission mechanism including a plurality of rate changing devices arranged in series relationship, a power operable device disposed to actuate one of said rate changing devices, a rate selector device disposed to actuate directly another of said rate changing devices and including a chart having markings indicating various rates corresponding to different settings of said rate changing devices, and control apparatus operable by said rate selector and functioning to control said power operable device in manner to effect combined settings of said rate changing devices in accordance with the indications of said chart.

JOSEPH B. ARMITAGE.

CERTIFICATE OF CORRECTION.

Patent No. 2,240,973. May 6, 1941.

JOSEPH B. ARMITAGE.

It is hereby certified that error appears in the printed specification of the above numbered patent requiring correction as follows: Page 2, first column, line 54, for "mchanism" read --mechanism--; page 4, second column, line 21, for the word "of" first occurrence, read --or--; page 5, second column, line 49, for the reference numeral appearing after "groove" read --174--; line 69, for "layer" read --lever--; page 12, second column, line 68, claim 46, for the words "as to brake" read --as a brake--; and that the said Letters Patent should be read with this correction therein that the same may conform to the record of the case in the Patent Office.

Signed and sealed this 1st day of July, A. D. 1941

(Seal)

Henry Van Arsdale,
Acting Commissioner of Patents.